310-334 SR

XR 3,882,429

United States Patent [19]

Martin

[11] 3,882,429

[45] May 6, 1975

[54] ULTRASONIC SIGNAL TRANSMISSION DEVICE WITH PHASE RESPONSE SHAPING

[75] Inventor: Tom Alan Martin, Collinsville, Conn.

[73] Assignee: Andersen Laboratories, Inc., Bloomfield, Conn.

[22] Filed: Mar. 29, 1974

[21] Appl. No.: 456,301

[52] U.S. Cl. ................ 333/30 R; 310/8.1; 310/8.3; 333/72

[51] Int. Cl. .......................... H03h 9/26; H03h 9/30

[58] Field of Search ......... 333/30 R, 72; 310/8, 8.1, 310/8.2, 8.3, 9.7, 9.8; 29/594

[56] References Cited

UNITED STATES PATENTS

| | | | |
|---|---|---|---|
| 3,564,460 | 2/1971 | Sittig ................................ | 333/30 R |
| 3,795,879 | 3/1974 | Whitehouse et al. ................ | 333/72 |

*Primary Examiner*—James W. Lawrence
*Assistant Examiner*—Marvin Nussbaum
*Attorney, Agent, or Firm*—Prutzman, Hayes, Kalb & Chilton

[57] ABSTRACT

An electrical signal transmission device such as a delay line or filter of the acoustic, reflection mode type wherein an input electrical signal is converted to acoustic energy propagating along a medium such as a thin rectangular strip of spring steel toward a mismatching structure such as an array of gratings which reflects a portion of the energy for further propagation and conversion to an output electrical signal. The phase response of the device is shaped or compensated by a region of phase affecting material, such as a thin mass-loading film of gold or similar material, located on the propagating medium in the path of the reflected signal. A pattern or profile generated from the measured phase response of the device is used to control application of the material, preferably by vapor deposition, the profile and thickness of the region or film being predetermined to shape the phase response without affecting the amplitude response.

17 Claims, 16 Drawing Figures

ULTRASONIC SIGNAL TRANSMISSION DEVICE WITH PHASE RESPONSE SHAPING

This invention relates to the art of electrical signal transmission devices of the acoustic, reflection mode type, and more particularly to a new and improved acoustic, reflection mode device provided with a shaped or compensated phase response and a method of making the same.

Electrical delay lines and filters having repetitively mismatched ultrasonic transmission lines find use in various communications and information processing systems. Acoustic, reflection mode devices as they are known in the art are a form of ultrasonic transmission line comprising a medium for supporting acoustic propagation and a mismatching structure in the medium, for example a region of gratings, from which a portion of the acoustically propagating signal is reflected. Transmitting and receiving transducer means are provided for converting an input electrical signal to an acoustic signal propagating along the medium and for converting a reflected acoustic signal into an output electrical signal. The device has an inherent or uncompensated phase response, i.e. phase change as a function of frequency, which is determined by physical characteristics of the device. For some applications of the device it would be highly desirable to alter or shape the phase response of the device as deemed necessary for the particular application. Furthermore, the device has phase errors defined as the difference between measured or experimental phase and mathematically predicted phase, and for applications of the device such as pulse compression it would be highly desirable to correct such errors. These errors can arise, for example, from fabrication errors, irregularities in the medium, and temperature changes.

It is, therefore, a primary object of this invention to provide a new and improved electrical signal transmission device of the acoustic, reflection mode type with a shaped or compensated phase response.

It is a more particular object of this invention to provide such a device wherein the phase response is altered or corrected in a manner which does not affect the amplitude response of the device.

It is a more particular object of this invention to provide such a device wherein the means for shaping the phase response provides a high degree of accuracy and reliability.

It is a further object of this invention to provide a method of shaping or compensating the phase response in an electrical signal transmission device of the acoustic, reflection mode type.

It is a more particular object of this invention to provide such a method which can be performed effectively and accurately and on various device configurations.

This invention provides an electrical signal transmission device of the acoustic, reflection mode type wherein an input electrical signal is converted to acoustic energy propagating along a medium toward a mismatching structure which reflects a portion of the energy for further propagation and conversion to an output electrical signal and wherein the phase response is shaped by a region of material located on the medium in the path of the reflected acoustic signal. The nature of the material and the profile or configuration and thickness of the region are selected or predetermined to shape or compensate the phase response in a desired manner without affecting the amplitude response. According to the method of this invention, the measured phase response of an uncompensated device is used to generate a plot or profile for controlling application of phase affecting material to the medium, the application preferably being by vapor deposition to provide a thin film having an outline or configuration of the profile. The method can be repeated any number of times to achieve the desired degree of phase shaping or compensation.

Other objects will be in part obvious and in part pointed out more in detail hereinafter.

A better understanding of this invention will be obtained from the following description and the accompanying drawings of an illustrative application of this invention.

Figure 4A:
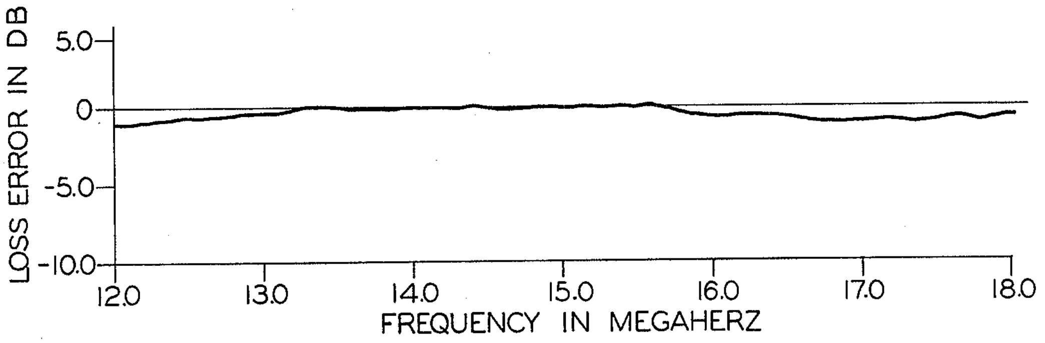
Figure 4B:
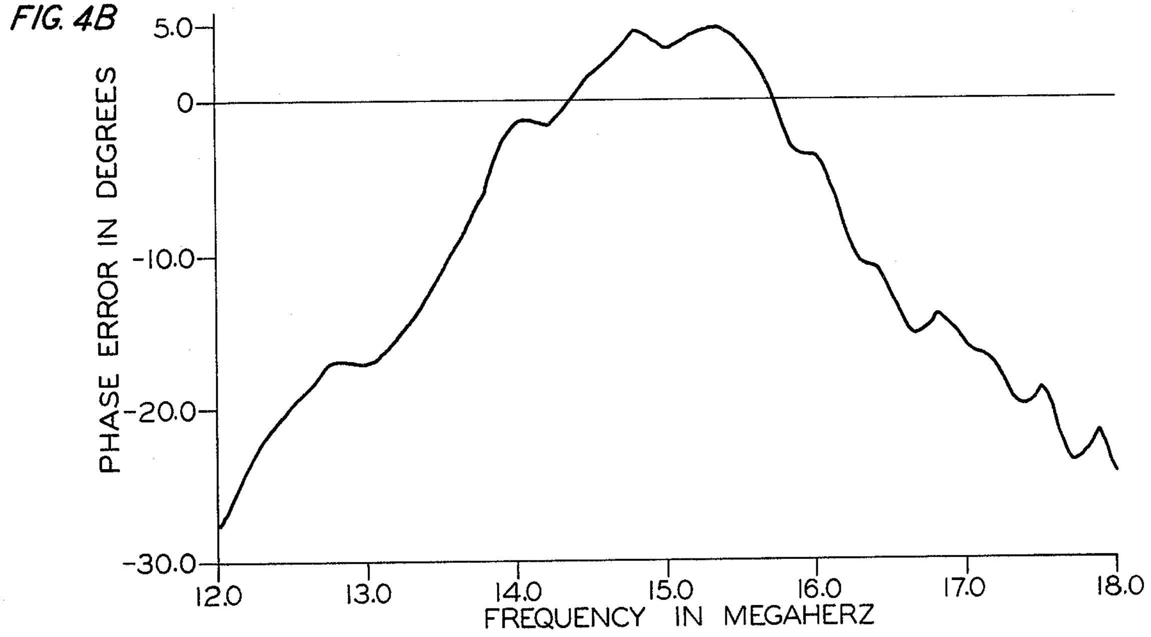
Figure 4C:
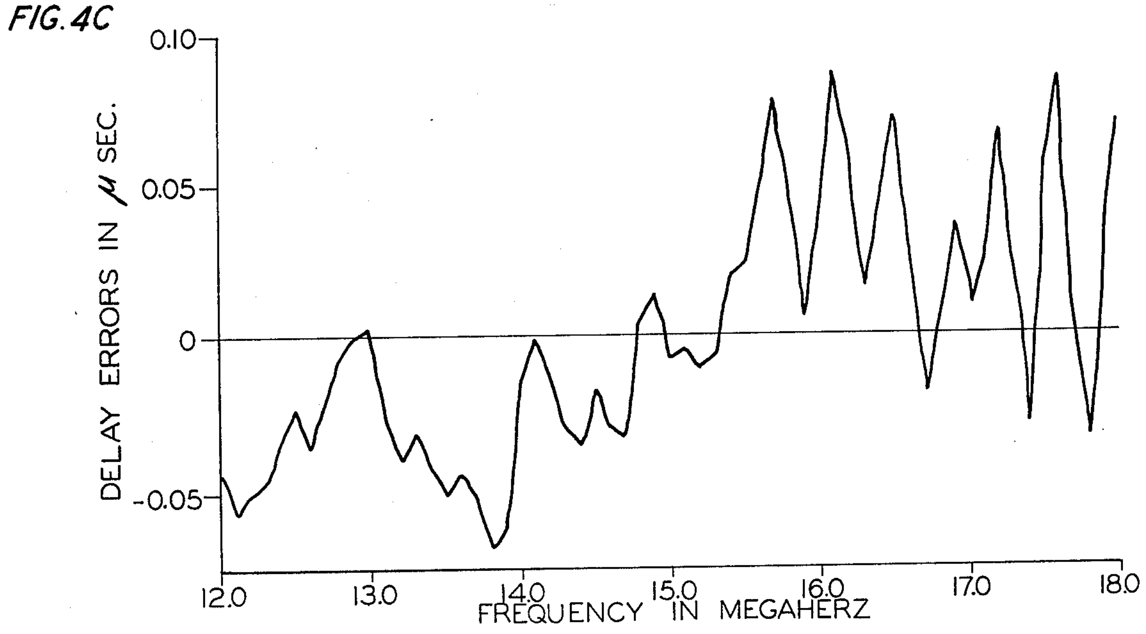
Figure 5:
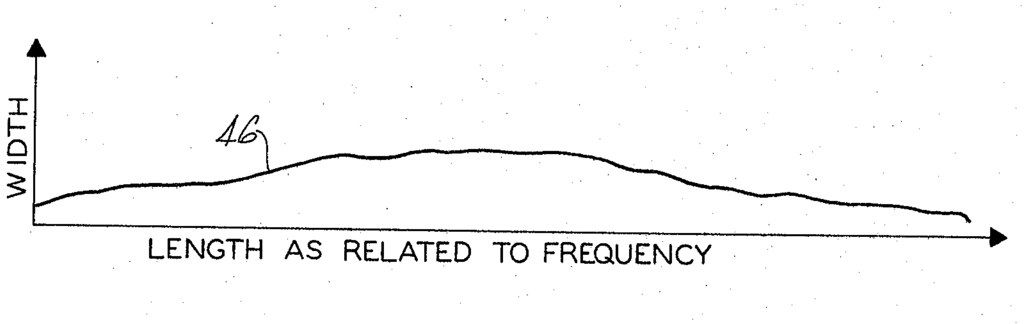
Figure 6A:
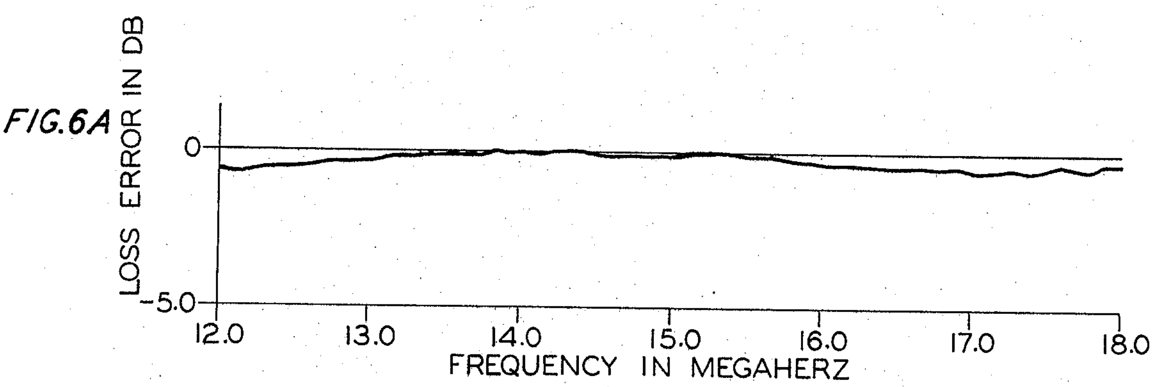
Figure 6B:
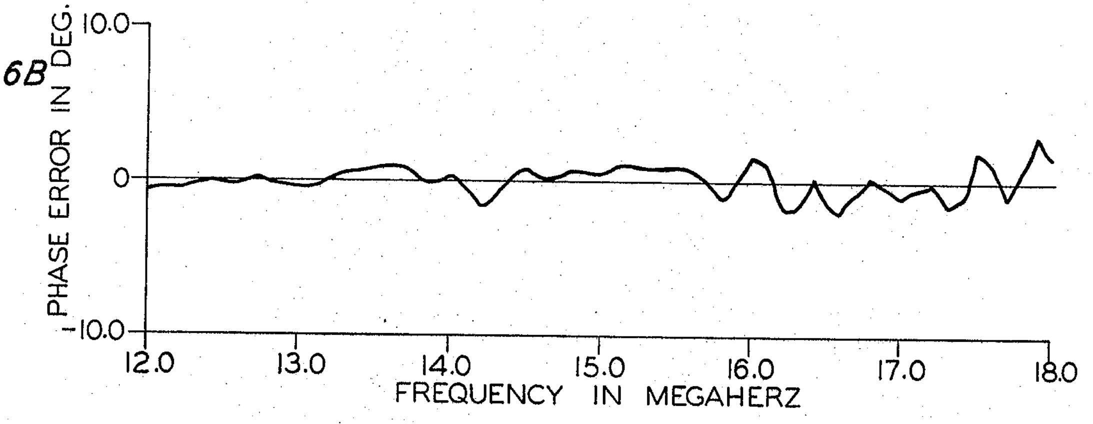
Figure 6C:
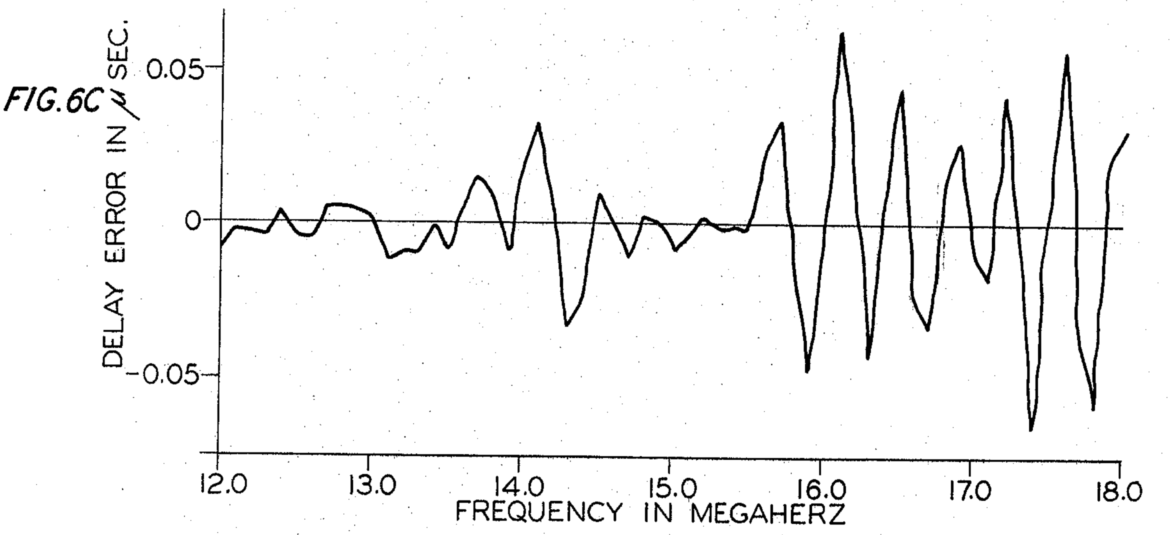
Figure 7A:
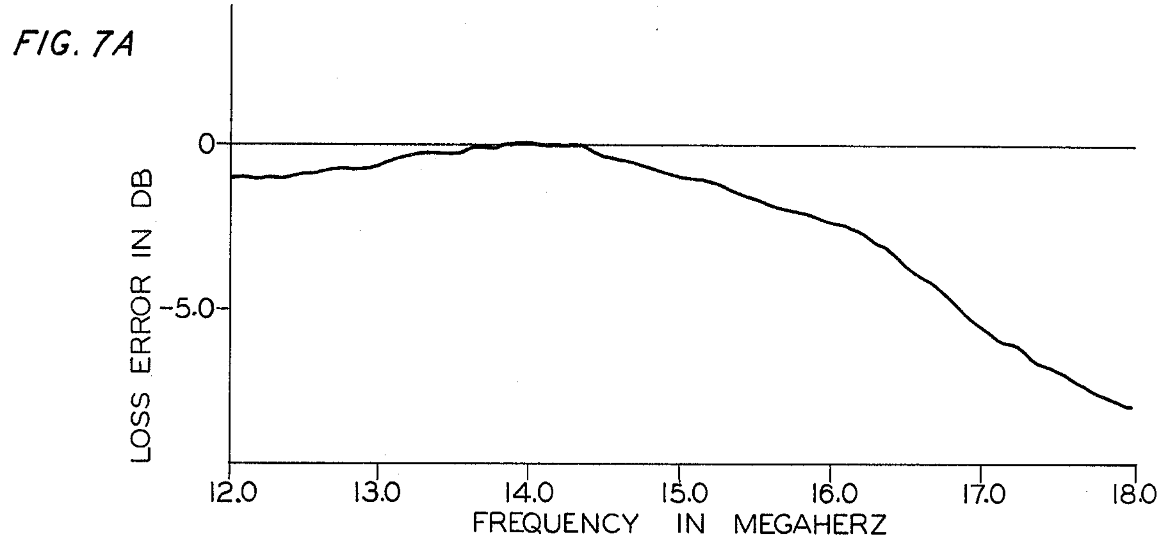
Figure 7B:
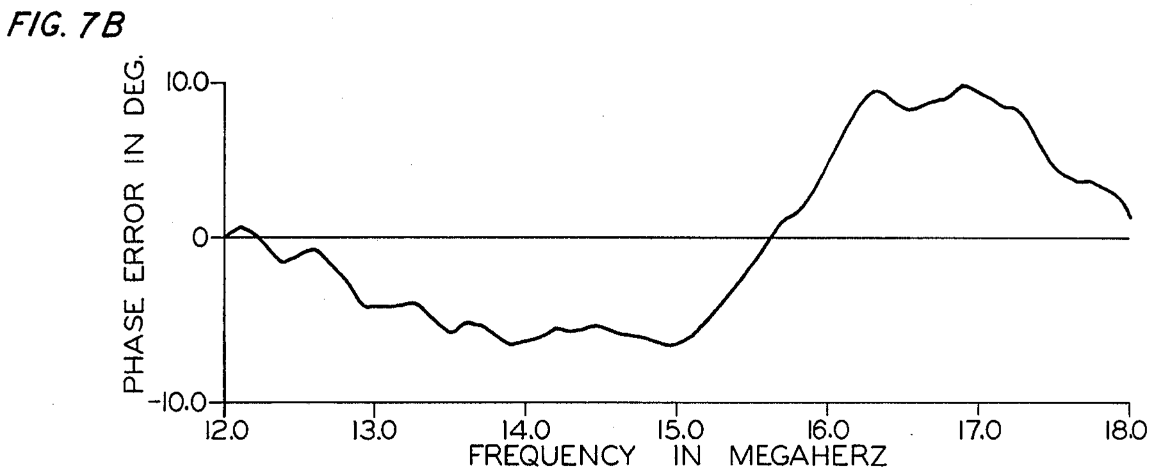
Figure 7C:
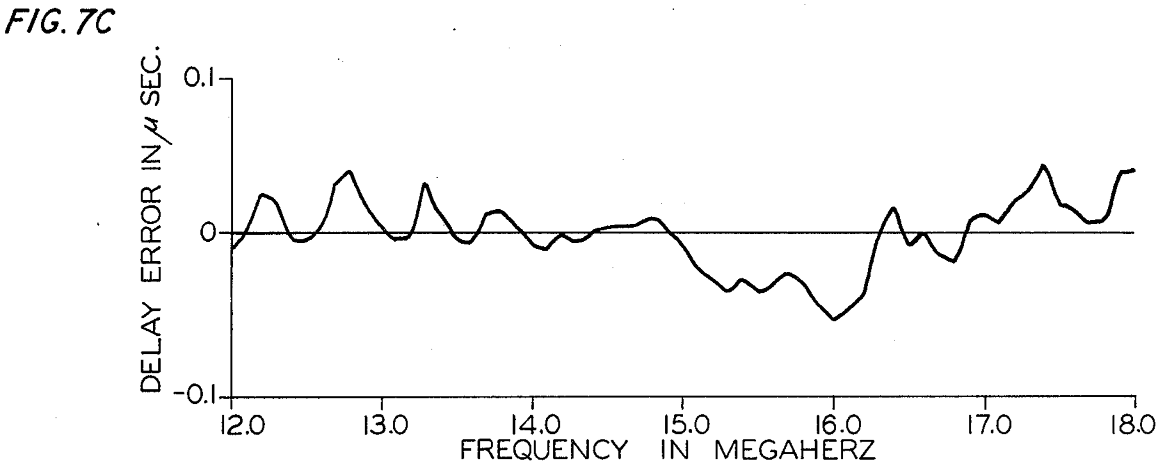
Figure 8A:
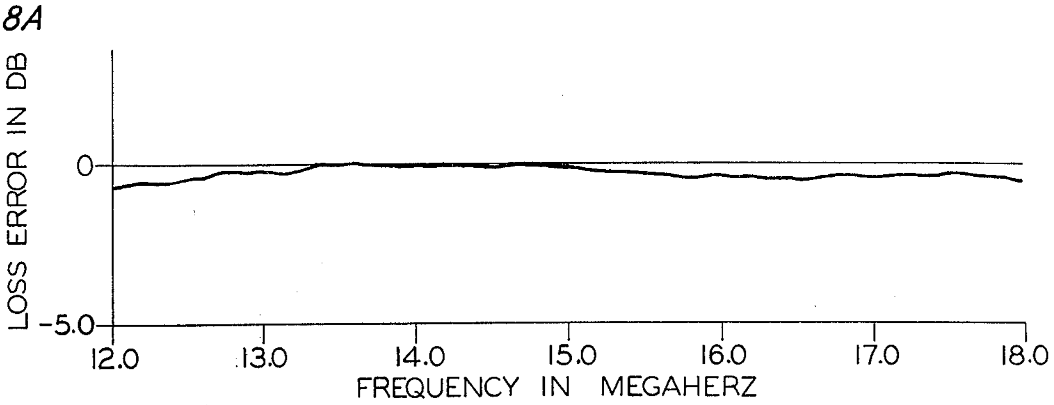
Figure 8B:
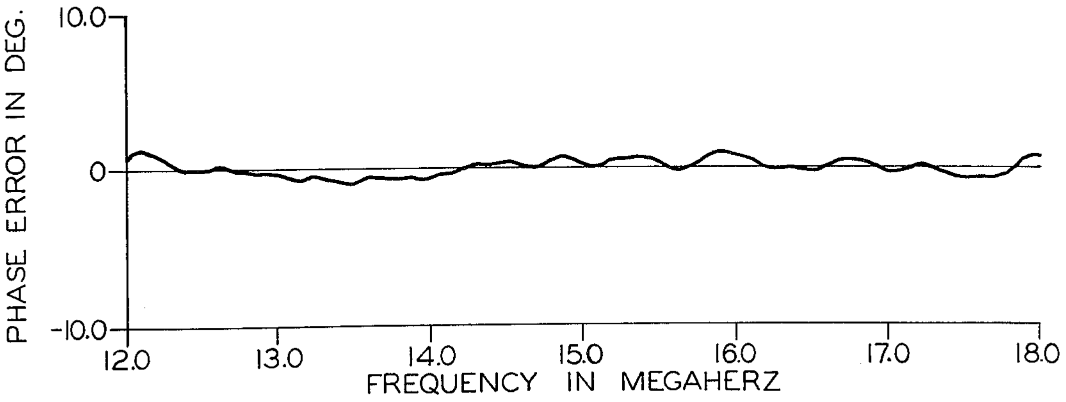
Figure 8C:
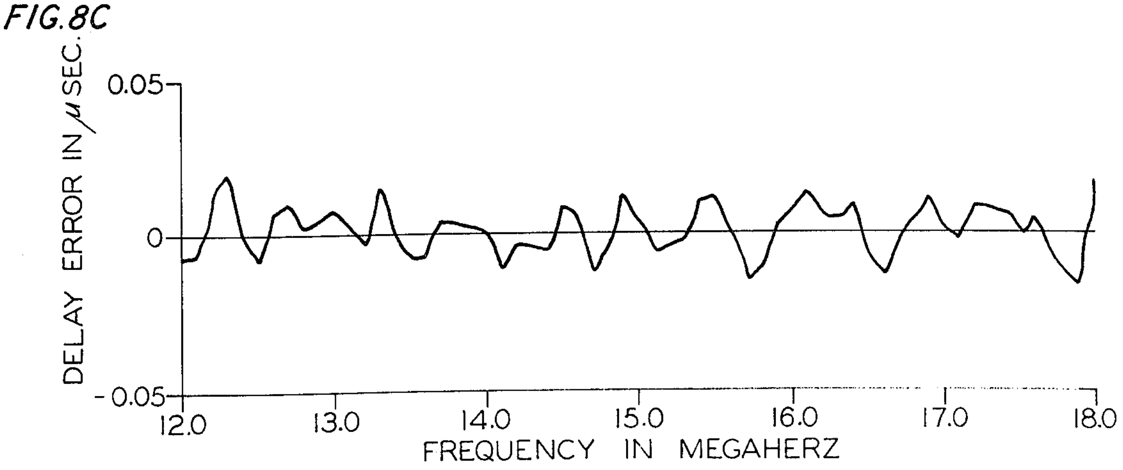

FIGS. 4*a*, 4*b* and 4*c* illustrate operation of a device prior to being provided with a shaped or compensated phase response according to this invention;

FIG. 5 illustrates a pattern or mask used in the method of this invention;

FIGS. 6*a*, 6*b* and 6*c* illustrate operation of a device after being provided with a shaped or compensated phase response according to this invention;

FIGS. 7*a*, 7*b* and 7*c* illustrate operation of a device prior to being provided with a shaped or compensated phase response according to this invention; and FIGS. 8*a*, 8*b* and 8*c* illustrate operation of a device after being provided with a shaped or compensated phase response according to this invention.

Figure 1:
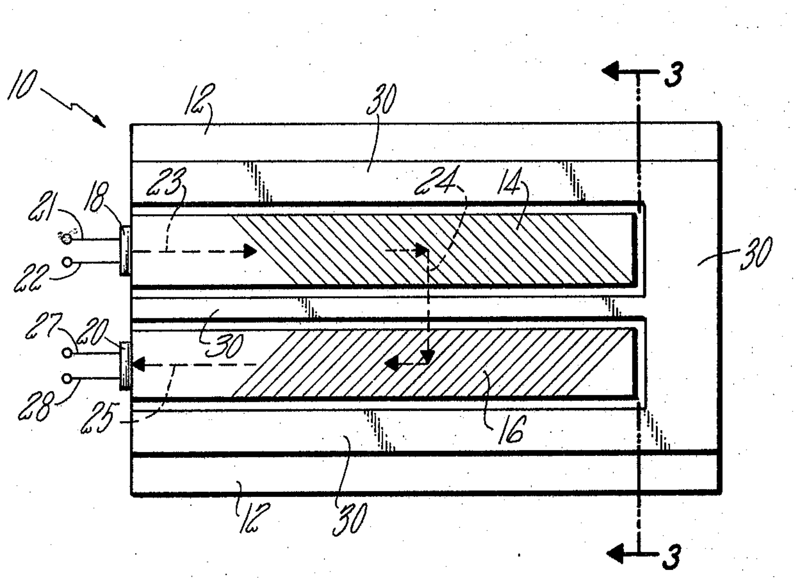
FIG. 1 is a top plan view of an electrical signal transmission device of the acoustic, reflection mode type provided with a shaped or compensated phase response according to this invention.
Figure 2:
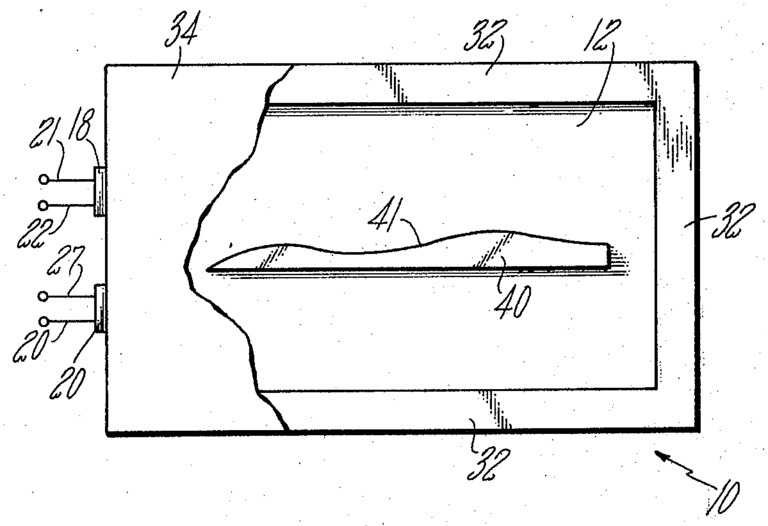
FIG. 2 is a bottom plan view of the device of FIG. 1.
Figure 3:
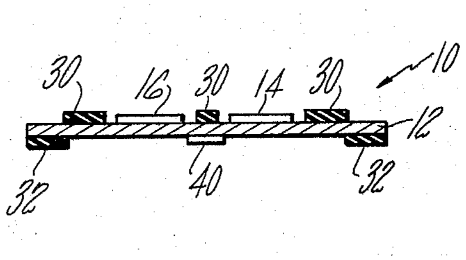
FIG. 3 is a sectional view generally along line 3—3 in FIG. 1.

FIGS. 1–3 illustrate an exemplary acoustic, reflection mode device 10 to which this invention is applicable. Device 10 is a reflection mode dispersive delay line wherein a thin rectangular strip 12 of spring steel comprises a medium for propagating acoustic energy. In the illustrative device 10, acoustic energy is propagated in the zero order plate shear mode which is naturally nondispersive, i.e. the phase velocity depends on neither frequency nor strip thickness, so long as the thickness of the medium or solid strip 12 is less than one wave length in the medium to prevent undesirable interaction with other plate modes.

The device 10 includes a mismatching structure in the medium 12. This mismatching structure is shown in the form of grating regions, i.e., a pair of grating patterns or arrays 14 and 16 each comprising a row or series of closely-spaced grating lines. The large number of grating lines, i.e. hundreds or thousands, may be defined by grooves etched by photolithographic or chemical milling techniques into the metal strip supporting the acoustic propagation. The two acoustic diffraction grating patterns 14, 16 in the present example are coplanar, spaced-apart and oriented mutually parallel to the longitudinal axis of strip 12. In each pattern 14, 16, the grating lines are disposed in such a way that the acoustic energy is always incident at an angle of 45 degrees. In other words, the lines are disposed at an angle of 45 degrees to the longitudinal axis of strip 12 and in a herringbone-like configuration as shown in FIG. 1. The dimensions of grating regions 14, 16 and the spacing between the lines of the regions depend upon the desired signal parameters. Transmitting and receiving transducers 18 and 20, respectively, are bonded to an edge of strip 12 and are poled in such a way to couple only to the zero order shear mode of the strip. Transducers 18, 20 preferably are of the ferroelectric ceramic variety, such as PSN or PZT types, and both usually are matched to 50 ohms.

In operation, an input electrical signal applied to leads 21, 22 of transducer 18 is converted to acoustic energy in the ultrasonic frequency range which progagates along strip 12 in the direction indicated by arrow 23 in FIG. 1 toward grating array 14. A portion of the energy is reflected by array 14 toward array 16 as indicated by arrow 24, from which reflected energy propagates in the direction indicated by arrow 25 to transducer 20 where it is converted to an output electrical signal across leads 27, 28. Thus, an acoustic path from the transmitting or input transducer 18 to the output or receiving transducer 20 in the arrangement of FIG. 1 will include a reflection off one grating line in each of the patterns 14, 16. In the area or region between grating arrays there is a 1:1 relationship between frequency and distance measured along the length of the gratings, i.e. along the longitudinal axis of strip 12. Because of this relationship, acoustic damping material 30 such as mastik material can be applied to strip 12 for shaping the amplitude response of device 10. In the specifically illustrated embodiment, material 30 is applied to the area of strip 12 between grating patterns 14, 16 and around both patterns as well. Spurious modes in the form of higher order shear and Lamb modes may be both reflected and transmitted from a grating line edge, and these modes are absorbed in material 30 and in a peripheral damping material such as tape 32 provided along and around the bottom edges of strip 12 as shown in FIG. 2. The bottom surface of strip 12 can be covered by a mounting board, shown fragmentarily at 34 in FIG. 2, of suitable material such as glass-filled epoxy. The entire device 10 can be contained or packaged in a suitable housing (not shown) provided with terminals for making electrical connections to transducer leads 21, 22 and 27, 28.

Phase errors in an acoustic, reflection mode device such as device 100 can arise from a number of causes. Fabrication errors such as positioning errors in the grating mask used to define the grating pattern translate to phase errors. Anomalies in the media supporting acoustic propagation also will cause phase discrepancies. Temperature changes also can give rise to quadratic phase errors, and direct r.f. signal leakage will result in a fast ripple on the phase response, adding vectorially to existing phase errors. In addition, degradation in the phase response is also due to phase ripples in the response of the device transducers.

In accordance with this invention, the acoustic, reflection mode device 10 is provided with means for shaping its phase response. A region 40 of phase affecting material is located on the medium or strip 12 in the path of the reflected acoustic signal. Region 40 has a profile or configuration and thickness which is predesigned or selected to shape the phase response of device 10 without affecting the amplitude response. Region 40 preferably is applied to strip 12 as a thin film or mass-loading material which is generally elongated, having a phase affecting edge 41 and operatively positioned in the path of acoustic energy between grating arrays or patterns 14, 16. Region or film 40 thus is positioned on strip 12 with the phase affecting profile of edge 41 being disposed generally transverse to the direction of the reflected acoustic signal. For an acoustically propagating signal in device 10 there exists a one-to-one relationship between frequency and distance measured from the transducers 18, 20 to any point along the length of grating arrays 14, 16. Thus the localized application of the thin mass-loading material 40 in the area between the two grating patterns 14, 16 can be used to shape and alter the phase response of the device 10 at a given frequency without affecting the amplitude response.

The phase response shaping means for an acoustic, reflection mode device such as device 10 is formed according to the method of this invention in the following manner. The phase response of an uncompensated device is measured. In measuring the phase shift over the pass band, an r.f. signal is passed through the propagating medium of the device connected electrically in parallel with an attenuator. Null points are established at intervals of odd pi radians, and frequency and attenuation measurements are taken. In particular, phase shift in degrees is given by $\theta = Bl$ where $B$ is the propagation constant of the material and $l$ is the length of travel. $B$ is given in radians per unit length by the relationship:

$$B = 2(\text{pi})f/Vp$$

where $f$ is the frequency of operation and $Vp$ is the velocity of propagation in the material. For a device of given design and of known dispersion operating over a given frequency range, one should be able to calculate the frequencies at which the phase shift through the device is a multiple of pi, i.e. at which the phase should be a multiple of 0° of 180°. Thus, the measurement technique is to determine the frequencies at which $\theta(f) = N(pi)$ and compare those to the theoretical ones. This shows the phase irregularities.

From the measured data of the frequency positioning of nulls in the propagation of energy through the device, a computation of the phase errors as a function of frequency can be performed. For long dispersive delay lines such as device 10 of the present illustration, this computation is usually done by a computer. FIGS. 4$a$, 4$b$ and 4$c$ are plots of loss errors, phase errors and delay errors, respectively, all as a function of frequency, for the device 10 in uncompensated form and derived by the foregoing procedure. In particular, the uncompensated device 10 was operated at a center frequency of 15 mhz, bandwidth of 6 mhz, minimum loss of 13.9 db, r.m.s. delay error of 3.97 microseconds, average slope of 16.7 microseconds/mhz and r.m.s. phase error of 14.2°.

The uncompensated phase response is utilized to generate a plot or profile for a mask for controlling application of compensating material onto a surface of the device. The plot or profile has the shape of the uncompensated phase response, modified to account for such factors as subsequent dispersion in the modified region of the device and non-uniformities in the compensating material or in its method of adhesion. A computer derived plot or profile 46 prepared according to the foregoing procedure applied to a typical device is shown in FIG. 5. The plot 46 is transferred such as by tracing from paper to suitable mask material, for example brass shim stock, which then is cut out to provide a profile. The resulting mask of brass shim stock then is used to make a profile of the pattern for application of the compensating material.

A method of application found to provide satisfactory results is vapor depositing the compensating material in a thin film on a surface of the device. The thickness of the applied material must be precisely controlled so as to be sufficient to affect the phase velocity of an acoustic signal propagating through the device but not of such thickness as to affect the signal amplitude. The compensating material is applied to a thickness for which the phase shift in the compensated region of the device due to application of the material just negates or cancels the measured phase response of the device. The phase shift in the compensated region of the device due to application, i.e. deposition or plating, of the material is given by the equation:

$\theta(w) = w(1/Vp(w) - (1/Vup))\, y(w)$ where $w$ is the circular frequency ($2pif$), $Vup$ is the phase velocity of the uncompensated or unplated substrate (i.e. strip 12 unplated), $Vp(w)$ is the phase velocity of the compensated plated substrate which is a function of substrate material and compensating or plating material thickness, and $y(w)$ is the mask dimension for the path corresponding to frequency, i.e. the lateral dimension of the media doing the compensating. By way of illustration, the controlled thickness of compensating material typically is in the range from about 100 Angstroms to about 10,000 Angstroms.

The application of the compensating material to the base acoustic material of the device, i.e. to strip 12, preferably is accomplished by thermal evaporation of the compensating material under high vacuum using thermal filaments or electron-beam guns. Other techniques such as sputtering (d.c. or r.f., diode or triode), plating, arc plasma spraying, painting and silk screening can be employed in conjunction with the appropriate density and thickness control. Alternatively, compensating material first can be applied to a surface of the device in the desired thickness, whereupon the mask is used to define the shape or configuration of the area to remain with the excess compensating material selectively etched away.

The compensating material must be of a type which has an appropriately large effect on the phase velocity of the acoustic propagating signal but which introduces negligible if any propagation attenuation. In addition, the compensating material preferably has a very high density and low-shear modulus. Golf is a preferred material due to its high density which affords good mass-loading phase changes with a minimum of thickness. A composite film including a thin layer of chromium and a layer of gold has been found to perform satisfactorily. Other conducting and even semiconducting materials may be used, and materials other than chromium, such as molybdenum or titanium, may be used. Aluminum is a preferred material for surface wave devices.

In an acoustic, reflection mode device having a thin strip as the propagating medium, the compensating material can be located on either surface. In a surface wave device, the compensating material preferably would be applied to the surface having the mismatching structure, i.e. grating array, directly between the two propagation paths. This is because surface acoustic waves decay exponentially into the propagating medium. In a zero order plate shear wave propagating device such as device 10 of the present illustration, the signal energy is uniformly distributed through the thickness of the propagating medium, i.e. strip 12, because all stresses in the plate medium are symmetrically distributed about the mid-plane of the plate. Thus the elastic signal has no knowledge of which side of strip 12 bears the compensating material, and as a result the material can be applied to the surface opposite the surface containing grating arrays 14, 16. This in fact is done as shown in FIGS. 1–3 for convenience due to the fact that acoustic damping material 30 is applied to the surface containing grating patterns 14, 16.

There is some flexibility and latitude in positioning and orienting the compensating material on the device surface. In device 10 which has two spaced-apart grating patterns 14, 16, the compensating material typically is placed centrally between the gratings 14, 16 but this is not mandatory. The orientation of the profile of compensating material relative to the grating patterns is not critical. What is important is the width of the compensating material in the path of the propagating signal together with the thickness of the compensating material. The computer-generated phase shaping or correcting profiles usually are produced as non-symmetrical entities with one edge being straight and the opposite edge, like edge 41 in FIG. 2, is displaced to form the non-uniform pattern. Alternatively, both edges of the entity can be displaced to form a symmetrical pattern. In summary, the two criteria affecting phase shift basically relate to the length and width of the film applied to the region of interest through which the signals propagate, i.e. between grating patterns 14, 16 in device 10, and the film thickness.

After the foregoing method is completed, the compensated phase response is measured, and plots like those in FIG. 6 show the response of a compensated device. In particular, the same device 10 from which the plots in FIGS. 4a–4c were derived but provided with a shaped phase response according to the method of the present invention was used to obtain data for the plots of FIG. 6. The device was operated at a center frequency of 15.0 mhz, bandwidth of 6 mhz, minimum loss of 15.31 db. r.m.s. loss error of 0.21 db. average delay of 88.81 microseconds, and r.m.s. phase error of 1.00°. FIGS. 6a, 6b and 6c are plots of loss error, phase error, and delay error, respectively, all a function of frequency.

In many instances, one cycle of the method of this invention reduces the peak phase error to approximately 20 percent of its initial value. However, if the measured phase errors still are larger than desired, the foregoing method simply is repeated and for whatever number of times is necessary to achieve the required phase response. That is, a fine adjustment of the device is achieved with further correction to diminish phase error by further measurements, preparation of a new profile or mask, and application or deposit of a new layer or film onto the device over the previously deposited film.

The compensating material for shaping or altering the phase response of an acoustic, reflection mode device does so by changing the velocity of acoustic propagation in the region of the device where it is applied. The velocity of acoustic propagation in the composite of two or more materials, i.e. steel strip 12 and film 40, differs from the velocity in the base material, i.e. strip 12, alone. As previously described, the compensating material may be a single material, different materials or alternating types of materials, and it may be applied in successsive steps to successively reduce the error or correct the phase or shape the phase response. The velocity of propagation of a shear-wave propagating material composed of two differing media can be shown to be given approximately by the equation:

$$V_{1,2} = Vu\ [1 + (Vc/Vu)^2 (p_c h_c / p_u h_u)/1 + (p_c h_c / p_u h_u)\ ]$$

where $Vu$, $p_u$ and $h_u$ are the acoustic velocity of propagation, density and thickness of the uncompensated propagating material, respectively, and $Vc$, $p_c$ and $h_c$ are the acoustic velocity of propagation, density and thickness of the compensating material, respectively. Similar equations can be derived for compensating media consisting of multi-layered materials. The phase shift in the compensated region of the device as a function of frequency in radians is given by the equation:

$$\theta(f) = 2(pi)f[(1/V_{1,2}(f) - (1/Vu(f)]\ W(f)$$

where $W(f)$ is the lateral dimension of the media doing the compensating. This equation is similar to the one described in detail earlier in the discussion of the method.

The device 10 illustrated in FIGS. 1—3 is provided with acoustic damping material 30 on the surface of strip 12 where grating patterns 14, 16 are present and is provided with region or film 40 of phase affecting material on the opposite surface. FIGS. 7 and 8 further illustrate the operation of such a device. In particular, FIGS. 7*a*, 7*b* and 7*c* are plots of loss error, phase error, and delay error, respectively, all as a function of frequency, in an uncompensated device 10 operated under the following conditions: center frequency 15 mhz, bandwidth 6 mhz, minimum loss 5.99 db. r.m.s. loss error 2.29 microseconds, average slope 16.7 microseconds/mhz and r.m.s. phase error 5.72°. The plots in FIG. 8 show the response of device 10 after amplitude response shaping by material 30 and phase response shaping by material 40. The amplitude and phase compensated device was operated at a center frequency of 15 mhz, bandwidth of 6 mhz, average delay of 88.80 microseconds, r.m.s. delay error of 8.51 microseconds, average slope of 16.67 microseconds/mhz, and r.m.s. phase error of 0.53°. FIGS. 8*a*, 8*b* and 8*c* are plots of loss error, phase error, and delay error, respectively, all as a function of frequency, in the amplitude and phase compensated device.

One area of use of this invention is reducing quadratic phase errors in pulse compression systems. Device 10 in the present configuration with the pair of spaced apart grating patterns is used, for example, in pulse compression radar. Most radar installations are peak power limited with range dependent upon energy which can be of limited amplitude and relatively long duration or it can be of relatively high amplitude and limited duration. Pulse compression permits transmission of a longer pulse with lower peak power.

In a pulse compression dispersive device, quadratic phase distortion will cause a broadening of and decrease in the amplitude of the compressed pulse as well as an increase in the amplitude of the time sidelobes, both of which are undesirable in pulse compression applications such as radar receivers, spectrum analysis, and spread spectrum communications. In radar systems, for example, it is desirable to provide a low side lobe requirement, such as about 40 db. to give good target resolution.

The phase characteristic of a device such as delay line 10 for pulse compression is defined in terms of the coefficients of a quadratic equation to which experimental data is fitted in a least-mean-square error sense. The defining equation can be given by:

$$\theta(f) = 2pi\ [A_o + A_1(f\text{-}f_o) - A_2\ (f\text{-}fo)^2]$$

where $fo$ is the center frequency, $A_1$ is the nominal time delay, $A_o$ is a constant phase term, and $A_2$ is half the delay slope. Phase errors are defined as differences between measured or experimental phase and those predicted by evaluating the above quadratic equation with the proper values $A_o$, $A_1$ and $A_2$. Thus, phase error as a function of frequency can be given by the equation:

$$\phi_e(fi) = \phi m(fi) - \phi\ (fi)$$

where $\phi m(fi)$ is the measured phase at the particular frequency $fi$ and $\phi\ (fi)$ is the predicted phase using the calculated values of $A_o$, $A_1$ and $A_2$.

While the present invention has been illustrated in connection with reducing quadratic phase-errors in a pulse compression device, the principles of this invention can be variously applied to shaping the phase response, that is the phase change as a function of frequency, as deemed necessary for the particular application and function. The method of the present invention is applicable to reflection mode dispersive and nondispersive delay lines and filters wherein the propagation of energy is by plate modes, either longitudinal or shear in nature, or by surface modes such as Rayleigh waves, Love waves or Bleustein-Gulyaev waves. Furthermore, the method is applicable to such devices of various configurations. Shaping or compensating the phase response according to this invention is done by strictly acoustic means, with an extremely high degree of accuracy, and without affecting the amplitude response of the device.

As will be apparent to persons skilled in the art, various modifications, adaptations and variations of the foregoing specific disclosure can be made without departing from the teachings of this invention.

The embodiments of the invention in which an exclusive property or privilege is claimed are defined as follows:

1. An electrical signal transmission device of the acoustic, reflection mode type comprising:

a. a medium for supporting propagation of acoustic energy;

b. a mismatching structure in said medium from which a portion of acoustically propagating energy is reflected;

c. transmitting and receiving transducer means for converting an input electrical signal into an acoustic signal propagating along said medium and for converting a reflected acoustic signal into an output electrical signal; and d. a region of phase affecting material located on said medium in the path of the reflected acoustic signal, the profile and thickness of said region being predetermined to shape the phase response of said device.

2. Apparatus according to claim 1, wherein said region is generally elongated and has a phase affecting profile along at least one edge, said region being disposed such that said edge is positioned generally transverse to the direction of the reflected signal.

3. Apparatus according to claim 1, wherein the profile of said region is determined from the measured phase response of said device.

4. Apparatus according to claim 1, wherein said region is of a material which affects the phase velocity of the reflected acoustic signal by an amount which sufficient to shape the phase response of said device and which introduces a negligible amount of propagation attenuation.

5. Apparatus according to claim 1, wherein said region is of a material having relatively high density and low shear modulus.

6. Apparatus according to claim 1, wherein said region is a thin vapor-deposited film of gold.

7. Apparatus according to claim 1, wherein said region comprises a composite thin film including a layer of chromium and a layer of gold.

8. Apparatus according to claim 1, wherein the thickness of said region is sufficient to affect the phase velocity of an acoustic signal propagating through said medium but not sufficient to affect the amplitude of the signal.

9. Apparatus according to claim 8, wherein the thickness of said region is of a magnitude such that the phase shift in said medium at the location of said region negates the measured phase error of said device.

10. Apparatus according to claim 1, wherein said medium comprises a thin strip of solid material and said mismatching structure comprises a pair of spaced apart grating patterns positioned on a surface of said strip in a manner such that an acoustic signal reflected from one pattern propagates toward the other pattern and wherein said region of phase affecting material is located on said strip so as to be in the path of an acoustic signal propagating between said patterns.

11. Apparatus according to claim 10, wherein acoustic damping material is provided on the surface of said strip containing said grating patterns and wherein said region of phase affecting material is located on the opposite surface.

12. A method of shaping the phase response in an electrical signal transmission device of the acoustic, reflection mode type wherein an input electrical signal is converted to acoustic energy propagating along a medium toward a mismatching structure which reflects a portion of the energy for further propagation and conversion to an output electrical signal, comprising the steps of a. preparing a pattern having a profile determined by the measured phase response of said device; and b. applying phase-affecting material to said medium under control of said pattern in a manner so as to shape the phase response without affecting the amplitude response.

13. The method according to claim 12, wherein said phase-affecting material is applied to said medium in a manner so as to be located in the path of the reflected acoustic energy.

14. The method according to claim 12, wherein said step of preparing a pattern comprises a. measuring the phase response of said device; and b. providing a plot from the shape of the phase response for preparing said pattern.

15. The method according to claim 12, wherein said step of applying phase-affecting material comprises vapor depositing said material onto said medium in the form of a thin film using said pattern as a mask to control the profile or configuration of said film.

16. The method according to claim 12, wherein said step of applying phase-affecting material comprises controlling the thickness of said material to be sufficient to affect the phase velocity of an acoustic energy signal propagating through the device but not to affect the signal amplitude.

17. The method according to claim 16, wherein said material is applied to a thickness for which the phase shift in the medium at the location of said material negates the measured phase error of the device.

* * * * *